(12) United States Patent
Kraemer et al.

(10) Patent No.: US 11,008,844 B2
(45) Date of Patent: May 18, 2021

(54) METHOD FOR HYDRAULIC FRACTURING (VARIANTS)

(71) Applicant: SCHLUMBERGER TECHNOLOGY CORPORATION, Sugar Land, TX (US)

(72) Inventors: Chad Kraemer, Katy, TX (US); Fedor Nikolaevich Litvinets, Biysk (RU); Sergey Vladimirovich Semenov, Kurgan (RU); Mohan Kanaka Raju Panga, Sugar Land, TX (US); Maxim Pavlovich Yutkin, Berdsk (RU); Ksenia Mikhailovna Kaprielova, Novosibirsk (RU); Sergey Sergeevich Skiba, Novosibirsk (RU); Bernhard Rudolf Lungwitz, Wuerzburg (DE); Denis Viktorovich Bannikov, Novosibirsk Oblast (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 11 days.

(21) Appl. No.: 15/772,826

(22) PCT Filed: Nov. 2, 2015

(86) PCT No.: PCT/RU2015/000733
§ 371 (c)(1),
(2) Date: May 2, 2018

(87) PCT Pub. No.: WO2017/078560
PCT Pub. Date: May 11, 2017

(65) Prior Publication Data
US 2018/0238161 A1    Aug. 23, 2018

(51) Int. Cl.
*E21B 43/267*      (2006.01)
*C09K 8/516*       (2006.01)
(Continued)

(52) U.S. Cl.
CPC ............ *E21B 43/267* (2013.01); *C09K 8/516* (2013.01); *C09K 8/584* (2013.01); *C09K 8/665* (2013.01);
(Continued)

(58) Field of Classification Search
None
See application file for complete search history.

(56) References Cited

U.S. PATENT DOCUMENTS 3,727,688 A    4/1973    Clampitt
4,920,912 A    5/1990    Kirkling
(Continued)

FOREIGN PATENT DOCUMENTS

RU    2485306 C1    6/2013
RU    2555989 C1    7/2015
(Continued)

OTHER PUBLICATIONS

McDaniel, "Horizontal Wells with Multi-Stage Fracs Provide Better Economics for Many Lower Permeability Reservoirs", Paper SPE 133427 at the SPE Asia Oil & Gas Conference and Exhibition in Brisbane, Australia, 2010, 12 pages.
(Continued)

*Primary Examiner* — Anuradha Ahuja
(74) *Attorney, Agent, or Firm* — Rodney Warfford

(57) ABSTRACT

A method of stimulating the inflow of oil and/or gas from the wellbore, in particular, a hydraulic fracturing method, is disclosed. The method of hydraulic fracturing comprises the stages: injecting a slug of a proppant-free fluid through the well into a formation for hydraulic fracture creation and propagation; injecting a slug of proppant-laden slurry into the formation to create a proppant pack in the hydraulic fracture; injecting a slug of slurry that contains a fluid and the polyelectrolyte complex-based proppant aggregates to
(Continued)

create permeable channels in the near-wellbore area of the hydraulic fracture; injecting a slug of a displacement fluid into the well. This sequence of operations allows avoiding the proppant slurry overdisplacement deep into the hydraulic fracture, maintaining high fracture conductivity, and increasing the well productivity.

13 Claims, 4 Drawing Sheets

(51) Int. Cl.
    *C09K 8/584*     (2006.01)
    *C09K 8/68*     (2006.01)
    *C09K 8/66*     (2006.01)
    *C09K 8/88*     (2006.01)
    *C09K 8/80*     (2006.01)

(52) U.S. Cl.
    CPC ............... *C09K 8/68* (2013.01); *C09K 8/80* (2013.01); *C09K 8/88* (2013.01); *C09K 2208/08* (2013.01)

(56) References Cited

U.S. PATENT DOCUMENTS

| | | | |
|---|---|---|---|
| 6,172,011 B1 | 1/2001 | Card et al. | |
| 6,406,789 B1 | 6/2002 | McDaniel et al. | |
| 7,281,581 B2* | 10/2007 | Nguyen ................... | C09K 8/80 166/280.2 |
| 8,020,617 B2 | 9/2011 | Shenoy et al. | |
| 8,397,812 B2 | 3/2013 | Huang et al. | |
| 8,596,358 B2 | 12/2013 | Kotlar et al. | |
| 8,636,065 B2 | 1/2014 | Lesko et al. | |
| 8,653,008 B2 | 2/2014 | Selle et al. | |
| 8,662,172 B2 | 3/2014 | Panga et al. | |
| 8,708,044 B2 | 4/2014 | Aston et al. | |
| 8,838,427 B2 | 9/2014 | Segal et al. | |
| 2003/0131998 A1 | 7/2003 | Nguyen et al. | |
| 2005/0019574 A1 | 1/2005 | McCrary | |
| 2006/0124303 A1 | 6/2006 | Nguyen et al. | |
| 2010/0044040 A1 | 2/2010 | Parlar et al. | |
| 2011/0118155 A1* | 5/2011 | Pisklak ............... | C04B 20/1074 507/274 |
| 2012/0068584 A1 | 3/2012 | Wind | |
| 2013/0048283 A1* | 2/2013 | Makarychev-Mikhailov .............. | C09K 8/685 166/280.2 |
| 2013/0056213 A1* | 3/2013 | Medvedev ............. | C09K 8/685 166/308.5 |
| 2013/0065800 A1 | 3/2013 | McDaniel et al. | |
| 2013/0192835 A1* | 8/2013 | Vorderbruggen ....... | E21B 43/04 166/305.1 |
| 2013/0233545 A1* | 9/2013 | Mahoney ................. | C09K 8/80 166/280.2 |
| 2014/0014338 A1* | 1/2014 | Crews .................... | E21B 43/26 166/280.1 |
| 2015/0060072 A1 | 3/2015 | Busby et al. | |
| 2015/0159465 A1 | 6/2015 | Lecerf et al. | |

FOREIGN PATENT DOCUMENTS

| | | |
|---|---|---|
| WO | 2010049467 A1 | 5/2010 |
| WO | 2012020955 A2 | 2/2012 |
| WO | 2013016158 A1 | 1/2013 |
| WO | 2015076693 A1 | 5/2015 |

OTHER PUBLICATIONS

Walsh et al., "Inflatable Packers: Production Applications", Long Beach, California : Paper SPE 17443 presented at the SPE California Regional Meeting, 1988, pp. 401-412.

Suarez-Rivera et al., "Defining Three Regions of Hydraulic Fracture Connectivity, in Unconventional Reservoirs, Help Designing Completions with Improved Long-Term Productivity", Paper SPE 166505 was prepared for presentation at the SPE Annual Technical Conference and Exhibition held in New Orleans. Louisiana, USA. Sep. 30-Oct. 2, 2013, 14 pages.

Blanton et al., "Hydraulic Pump-Down Frac Plug and Subsequent Coiled-Tubing Removal Increases Client Efficiency in Barnett Shale Play", SPE 100139, 2006 SPE/ICoTA Coiled Tubing and Well Intervention Conference and Exhibition, Apr. 4-5, 2006, 4 pages.

Van Poollen et al., Hydraulic Fracturing—Fracture Flow Capacity vs Well Productivity, SPE 890, s.l. : 32nd annual Fall Meeting of Society of Petroleum Engineers, vol. 213, 1958, pp. 91-95.

Oddo et al., "Why Scale Forms and How to Predict It.", SPE 21710, SPE Production & Facilities, Feb. 1994, vol. 9, pp. 47-54.

Vetter et al., "Prediction of Scale Problems Due to Injection of Incompatible Waters.", SPE 7794, Journal of Petroleum Technology, Feb. 1992, vol. 34., pp. 273-284.

Jordan et al., "The Application of Wax Divertor to Allow Successful Scale Inhibitor Squeeze Treatment to Sub Sea Horizontal Wells, North Sea Basin", New Orleans : SPE 49196 Annual Technical Conference and Exhibition, 1998, pp. 633-643.

Patterson et al., "Squimulation: Simultaneous Well Stimulation and Scale Squeeze Treatments in Deep Water, West Africa", SPE 151863, SPE International Symposium and Exhibition on Formation damage Control, Feb. 15-17, 2012, 20 pages.

Hinrichsen, "Preventing Scale Deposition in Oil Production Facilities: An Industry Review", Corrosion 98, Paper No. 61, NACE Conference, 1998, 29 pages.

Richardson et al., "Consolidation of Silty Sands with an Epoxy Resin Overflush Process", SPE 2189, Journal of Petroleum Technology, Sep. 1970, pp. 1103-1108.

Murphey et al., "Sand Consolidation Systems Placed with Water", Fall Meeting of the Society of Petroleum Engineers of AIME, Oct. 6-9, 1974, vol. SPE 5031, 12 pages.

Rhein et al., "Channel Fracturing in Horizontal Wellbores: the New Edge of Stimulation Techniques in the Eagle Ford Formation", SPE 145403, 2011 SPE Annual Technical Conference and Exhibition, Oct. 30-Nov. 2, 2011, 15 pages.

Benish et al., "Advancing Multi-Stage Fracturing Using Horizontal JITP and Autonomous Completion Systems", Paper IPTC 16813, International Petroleum Technology Conference, Mar. 26-28, 2013, 14 pages.

Cipolla et al., "New Algorithms and Integrated Workflow for Tight Gas and Shale Completions", SPE 146872, SPE Annual Technical Conference and Exhibition, Oct. 30-Nov. 2, 2011, 18 pages.

Hibbeler et al., "An Integrated Long-Term Solution for Migratory Fines Damage", SPE Conference Paper 81017, SPE Latin American and Caribbean Petroleum Engineering Conference, Apr. 27-30, 2003, 11 pages.

Hess et al., "Terminology of Polymers Containing Ionizable or Ionic Groups and of Polymers Containing Ions", Pure Appl. Chem., vol. 78, No. 11, pp. 2067-2074, 2006.

Examination Report issued in GCC Patent Appl. No. GC 2016-32210 dated Apr. 18, 2019; 4 pages.

\* cited by examiner

METHOD FOR HYDRAULIC FRACTURING (VARIANTS)

The present technical solution is directed to methods for stimulating the oil and/or gas inflow from the wellbore and, in particular, to methods of hydraulic fracturing.

PRIOR ART

Hydraulic fracturing is widely used for well stimulation. In this technology, a fluid is injected into a subterranean formation under high pressure which exceeds the rock fracturing pressure to form fractions. A proppant is injected with the fluid into the subterranean formation to prevent the fractures from closing when pressure is released upon completion of the well treatment.

In many cases, operators perform multi-stage hydraulic fracturing (a well-known practice for inclined and horizontal wells), which considerably increases the permeability of the zone around the well. Each stage is one complete hydraulic fracturing operation. Hydraulic fracturing comprises creating and expanding a fracture in the formation and injecting the proppant (the propping agent) to create a highly conductive proppant pack, through which the produced fluid flows into the wellbore. The hydraulic fracturing intervals in the well are separated from each other by isolating mechanical devices, such as an isolating packer plug. However, the installation of such mechanical devices assumes the complete cleaning of a well section to remove the proppant that may remain from the previous hydraulic fracturing stage.

The general approach to dealing with the problem of removing the remaining proppant from the wellbore is to inject a slug (a liquid portion) of a displacement fluid. The displacement fluid is injected directly after the last proppant slug of the fracturing fluid without reducing the injection rate. The displacement fluids are injected into the well so as to transport the carrier fluid to the bottomhole. Available aqueous fluid, most often water or water with the added friction-reducing polymer reagent, is used as the displacement fluid. The displacement fluid volume should be equal to or should exceed the volume of the pipe string, through which the mixture of the proppant (sand) was delivered. However, the excessive overdisplacement (i.e. an excessive volume of the displacement fluid) can force the proppant out of the near-wellbore area of the fracture, which creates the risk of fracture closure in the proppant-poor near-wellbore area. This closure reduces the hydraulic fracture conductivity and thereby decreases the well productivity.

Hydraulic fracturing of the formation is a standard practice for increasing the productivity of oil and gas wells. Among the numerous factors that determine the throughput of the fractures created in the treated formation, three factors can be distinguished that are relevant to the proposed method.

1. Overdisplacement is the removal (flushing) of the proppant material from the near-wellbore area after the proppant is placed in the fracture. Such proppant flushing may result in a low permeability of fractures due to the partial closure of the fracture walls after the pressure is reduced. Overdisplacement occurs when the displacement fluid volume is excessive: overdisplacement results in the reduction of the effective fracture conductivity and decreased well productivity. Avoiding overdisplacement is the standard practice in calculating the schedule of injection in the hydraulic fracturing stages. The fluid injection is stopped after the last proppant slug passes through the perforation openings in the casing.

2. The flowback of the proppant (and small particles) from the formation into the well may result in the proppant loss from the near-wellbore area, unpropped fracture closure with a loss in fracture conductivity and, as a result, the reduced productivity of the production well. Moreover, the flow-back proppant is abrasive material and can damage the pump tubing, valves, gates, piping, and other equipment.

3. The factor of filling the pore space with fine particles. The particles (fine-grained phase, or "fines") that are carried over from the formation will gradually fill the space and pores in the proppant pack thereby reducing the permeability of the proppant pack and hydraulic fractures. Even a small amount of fine particles (volume fraction of up to 10-20%) can reduce the proppant pack permeability by 3-5 times [Hydraulic Fracturing—Fracture Flow Capacity vs Well Productivity. van Poollen, H. K. SPE 890: 32nd annual Fall Meeting of Society of Petroleum Engineers, 1958]. An incorrect choice of the hydraulic fracturing fluid may result in de-consolidation (loosening) of the fracture walls and additional flowback of particles, deposits, clays, mineral deposits, etc. [Prediction of Scale Problems Due to Injection of Incompatible Waters. Vetter, O. J., Kandarpa, V., and Harouaka, A. SPE-7794-PA, Journal of Petroleum Technology, Vol. 34, issue 2, 1982].

Various approaches have been developed to reduce the negative impact of the above factors [An Integrated Long-Term Solution for Migratory Fines Damage, Hibbeler, J., Garcia, T., Chavez, T., 1017-MS SPE Conference Paper—2003].

A hydraulic fracturing system is described in U.S. Pat. No. 6,172,011 (Schlumberger Technology Corporation, published on 9 Jan. 2001), which comprises the injection of the final proppant slug prepared as a homogeneous mixture of a viscous fluid, a proppant, and a fibrous material. In particular, the presence of fibers (natural or synthetic fibers) in the final slug of the proppant slurry ("tail-in" stage) reduces the flowback of the proppant from the fracture after the hydraulic fracturing is completed.

U.S. Pat. No. 8,636,065 (Schlumberger Technology Corporation, published on 28 January 2014) describes a method of hydraulic fracturing and heterogeneous proppant placement, which comprises the tail-in stage of injecting the final (near-wellbore) proppant slug into the hydraulic fracture. According to U.S. Pat. No. 8,636,065, the hydraulic fracturing method comprises the heterogeneous placement of the proppant pillars in the main portion of the fracture, while a branched network of channels between the proppant pillars ensures high conductivity of the proppant pack. The tail-in stage (a final portion of proppant-laden frac fluid) is injected as a continuous injection of the proppant slurry. When delivered into the hydraulic fracture, this slug of fluid forms the "tail-in pack", which generally may differ in porosity, permeability, and strength from the main proppant pack in the hydraulic fracture. At this tail-in stage, the proppant is chosen from the proppant class of uniform size, and this final slug of the proppant pack ensures high porosity and high strength of the pack. In other words, the tail-in part of the hydraulic fracturing operation is performing the hydraulic fracturing operation where the standard proppant is placed near-wellbore. The proppant strength at this stage is high enough to avoid the crush of proppant particles (with formation of fines) at the fracture closure stage. At the same time, this final stage of injecting the homogeneous proppant into the near-wellbore area (near-wellbore slurry slug) is implemented so that the next operation of injecting a clean displacement fluid ("displacement" stage) does not cause proppant overdisplacement deeper into the fracture and deterioration of the propping properties of the proppant pack.

A method of preventing the overdisplacement of the proppant/sand at the tail-in stage is described in patent application US2015159465 (published on 11 Jun. 2015). The hydraulic fracturing method comprises creating a fracture in a formation under treatment, injecting the predetermined amount of the proppant into the well together with the carrier fluid, injecting a plugging agent as the final slug (without reducing the fluid pressure), and creating a temporary plug in the fracture from the delivered plugging agent. In particular, the temporary (removable) plug may contain a degradable or soluble material (fibers or particles), which allows the recovery of the fracture conductivity after removing the temporary plug due to plug degradation. At the same time, the installation of a strong plug made of a dispersed material may pose some technical difficulties when implementing hydraulic fracturing.

Moreover, it is known from practice that the homogeneous proppant pack with a small pore space will be clogged up with fines more readily at the stage of operation or plugged with the products of mineral or organic sedimentation at the stage of producing water-oil fluid. Additionally, due to the increased rate of the produced fluid in the near-wellbore area of the fracture (and this is a bottleneck for the produced fluid to flow into the well), it is in this near-wellbore zone of the hydraulic fracture that the risk of proppant and fines flowback increases. So, the hydraulic fracturing operations may be complicated by such phenomena as clogging of the pore space and flowback of the proppant from the fracture.

The use of the proppant aggregates (or proppant agglomerates) is well known to address these problems in the hydraulic fracturing operations. Thus, application US2012068584 ("Hydrocarbon-based fluid composition and method of using same") describes the formation of the agglomerates in fracturing fluid based on hydrocarbons (oil, diesel) including a small (up to 5%) amount of water. Water affects sand particles like "physical glue" and joins the sand particles together. This reduces the proppant flowback in the bound form. However, the use of hydraulic fracturing with a hydrophobic (oil-containing) liquid used as a carrier fluid is limited in oil production practice. The strength of such agglomerates is also low and prevents transporting the required amount of the proppant.

Application WO2015/076693 ("Controlled inhomogeneous proppant aggregate formation," published on 25 May 2015) describes a method for improving the fluid flow into a hydraulic fracture, which comprises the formation of slurry from the proppant, light particles, and the carrier fluid. The carrier fluid may become a binding medium that promotes the formation of agglomerates made of proppant particles and light particles. Slurry is injected into the formation, and agglomeration of the proppant and/or light particles is induced. In particular, the binding fluid is formed when a cationic polyelectrolyte (or its precursor) interacts with an anionic polyelectrolyte (or its precursor), and the aggregates of solid particles (sand and light particles) are generated due to formation of the polyelectrolyte complex (PEC). The produced PEC clusters hold sand particles and other particles within their volume. The consolidation of sand slugs reduces the proppant flowback from the treated formation. Low specific weight of the produced PEC-based aggregates (compared to the specific weight of sand) decreases the settlement of sand in the hydraulic fracturing process and ensures better transport of sand to the fracture.

The composition and methods for producing polymer composites comprising particles of a solid agent (proppant or fibers) are described in patent application US20150060072 (published on 5 Mar. 2015). In an embodiment of the disclosure, the solid agent (proppant) is covered with a coat of polyanion, and then the polymer-coated proppant is added to the solution of an oppositely charged polyelectrolyte (e.g. hydrated gel of carboxymethyl cellulose, CMC). Vigorous mixing of two polymers results in the formation of elongated polymer structures due to PEC formation around the proppant particles. This approach produces "fiber-like composites" from polymeric fluids in-situ, by initiating the consolidation of the dissolved polymers with shear stress applied to polymeric fluid. Such fiber-like composite polymer structures play the role of fiber additives to the treatment fluids practised in the oil and gas industry (the list of applications includes fluid-loss additives, compositions for water isolation, fracturing fluids, drilling fluids, cementing compositions, etc.

The key concepts of "polyelectrolyte", "polyelectrolyte complex (PEC)", "polyelectrolyte complex-based aggregate" are hereinafter understood in harmony with the terminology of patent document WO2015/076693. "Polyelectrolyte" is a polymer consisting of macromolecules, in which a considerable part of their repeating units include ionized or ionizable groups. "Polyelectrolyte complex" is an essentially neutral polymer-polymer complex of macromolecules carrying charges of opposite sign causing the macromolecules to be bound together by electrostatic interaction, according to the definition of the IUPAC recommendations [Pure Appl. Chem., Vol. 78, No. 11, pp. 2067-2074, 2006. IUPAC Recommendations 2006]. Cationic polyelectrolytes are also known as "polybases", and anionic polyelectrolytes as "polyacids". The fact that after cross-liking a polymer gel forms a single phase, and the consolidation of polymers in the polyelectrolyte complex forms two distinguishable phases, i.e. dense clusters of the polymer-polymer complex and a low-viscosity fluid with the residual concentrations of the initial polyelectrolytes, is one of the external features that distinguish polyelectrolyte complexes from a polyelectrolyte-based cross-linked gel. The aggregates (clusters) of the polyelectrolyte complexes also exhibit adhesiveness to solid particles. In other words, a polymer-polymer complex can serve as a "consolidating agent" or a "binding agent" for solid particles in the well treatment fluid.

The concept "proppant aggregate" or "proppant agglomerate" is attributed to the consolidating phase, which contains a concentration of the proppant sufficiently high for the proppant particles in the proppant aggregate to perform the propping function in the fracture. Because of the binding properties of the polyelectrolyte complex, the proppant aggregate is delivered into the well and exists in the form of a separate phase, which is different from the carrier fluid in rheology.

In the literature, the result of the interaction between a water-soluble charged polyelectrolyte (polycation or polyanion) and an oppositely charged surface active compound (surfactant) is also included in the category of polyelectrolyte complexes. When encountering a macromolecule, the charged groups of surfactants neutralize the oppositely charged groups of the polyelectrolyte macromolecule (the surfactant creates a neutralizing coating around the charged polymer molecule) and create an neutral complex (PEC). Examples of such compositions in the form of polymer-surfactant can be found in patent application US2015060072.

The technical solution is directed to creating a hydraulic fracturing method that ensures the high conductivity of the proppant pack as a whole due to the high conductivity of the near-wellbore proppant pack, the safe injection of the displacement fluid at the end of the hydraulic fracturing operation, and achieves the high conductivity of the propped fracture at the period of production.

SUMMARY

The method of hydraulic fracturing includes the following stages:

injecting a slug of the proppant-free fluid through the well into the formation so as to create and propagate the hydraulic fracture; injecting a slug of the proppant slurry to create a proppant pack in the hydraulic fracture. A slug of slurry comprising a fluid and polyelectrolyte complex-based proppant aggregates is then injected into the formation to create permeable channels in the near-wellbore area of the hydraulic fracture. A slug of the displacement fluid is then injected into the well to flush the residual proppant from the wellbore. When the bottomhole pressure falls below the formation fracture pressure, the hydraulic fracture is closed.

Another embodiment of the method is to perform hydraulic fracturing with the subsequent isolation of the hydraulic fracture. The next hydraulic fracturing operation is then performed in the next interval.

The proppant aggregates located in the fracture near the wellbore (in the near-wellbore area) ensure high conductivity of the fluid flow through the permeable channels and strength of the proppant aggregates (pillars) to hold the fracture walls when the hydraulic fracturing operation is completed. The displacement fluid removes (washes out) the proppant from the wellbore. At the same time, the proposed technical solution allows the proppant overdisplacement to be avoided in the near-wellbore area of the hydraulic fracture. Moreover, the presence of permeable channels in the near-wellbore area helps avoid the clogging of the near-wellbore area with fine particles, which may be present in the fluid produced from the formation.

DESCRIPTION OF EMBODIMENTS

The method of hydraulic fracturing comprising the steps of injecting the final slug of the proppant slurry and the displacement fluid into the formation, as well as its difference from the known hydraulic fracturing methods using the displacement fluid can be understood from illustrations in FIGS. 1-4.

Figure 1A:
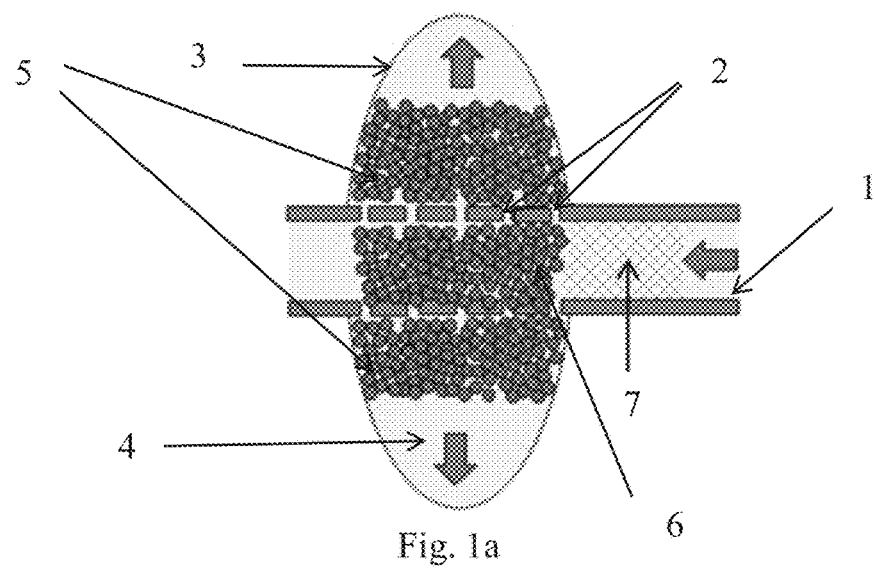
FIG. 1a shows schematically the hydraulic fracturing operation according to the prior art technology. The diagram shows hydraulic fracture formation and propagation and feeding the displacement fluid.
Figure 1B:
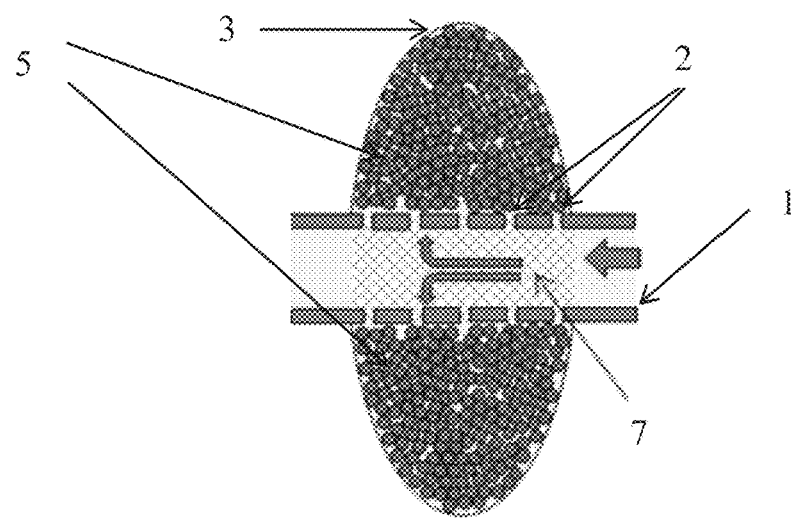
FIG. 1b shows schematically the hydraulic fracturing operation according to the prior art technology. The diagram shows proppant pack formation in the fracture and injecting a displacement fluid slug.
Figure 1C:
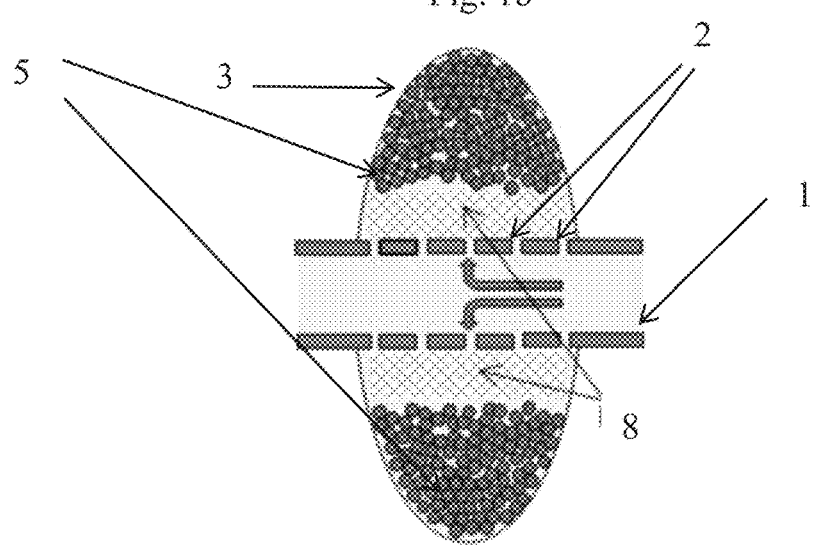
FIG. 1c shows schematically the hydraulic fracturing operation according to the prior art technology. The situation of undesirable proppant slurry overdisplacement and creating a proppant-deficient near-wellbore zones is shown.

FIG. 1a, FIG. 1b, FIG. 1c show the multi-step hydraulic fracturing operation according to prior art for treating of hydrocarbon wells. An example is provided for the case of a horizontal well with a casing that has clusters of perforation openings.

FIG. 1a shows the initial step of the hydraulic fracturing. A clean fracturing fluid (pad) 4 is injected under high pressure into the well with a casing 1 through perforation openings 2, which leads to fracture 3 formation and propagation in the productive formation. Following the pad fluid 4, the proppant slurry in a carrier fluid is injected. With gradual filtration of the pad fluid 4 into the surrounding formation, a proppant pack 5 is formed from the proppant slurry in the fracture 3 inside two opposite wings of the hydraulic fracture. A small portion of the proppant 6 remains in the wellbore (failed to be transported into the fracture 3). For further well operations, this excessive proppant portion is removed from the wellbore (operation of removing the proppant from the wellbore).

FIG. 1b shows the second stage of hydraulic fracturing. Following the proppant slurry slug (total of the proppants 5 and 6), a slug of a displacement fluid 7 is injected into the well. The displacement fluid 7 is proppant-free and usually this is plain water with a minimum amount of additives.

With the calculated proportions of the proppant slurry amount and the displacement fluid amount, all the proppant 6 will be displaced by the displacement fluid 7 from the wellbore (complete displacement situation), i.e. the remaining proppant slurry is fully transported into the hydraulic fracture 3. The wellbore pressure is then reduced below the fracture pressure level (this step is not shown), and the fracture walls close on the proppant pack while allowing the formation fluid to flow along the propped fracture 3 with a high conductivity due to the proppant pack 5.

FIG. 1c shows the undesirable situation of the proppant overdisplacement deep into the fracture during hydraulic fracturing according to the prior art technologies. If the displacement fluid 7 amount is taken in excessive amount in relation to the total proppant slurry amount, the displacement fluid 7 will partly displace the proppant 5 from the near-wellbore area 8 of the fracture, and areas deficient in the proppant will be formed. In this situation of the proppant overdisplacement (or "excessive displacement"), the subsequent pressure reduction in the well and closure of the fracture 3 will cause the fracture 3 walls in the unpropped near-wellbore area 8 to close ("pinching of fracture"), which results in reduced hydraulic conductivity of the entire fracture 3.

Figure 2A:
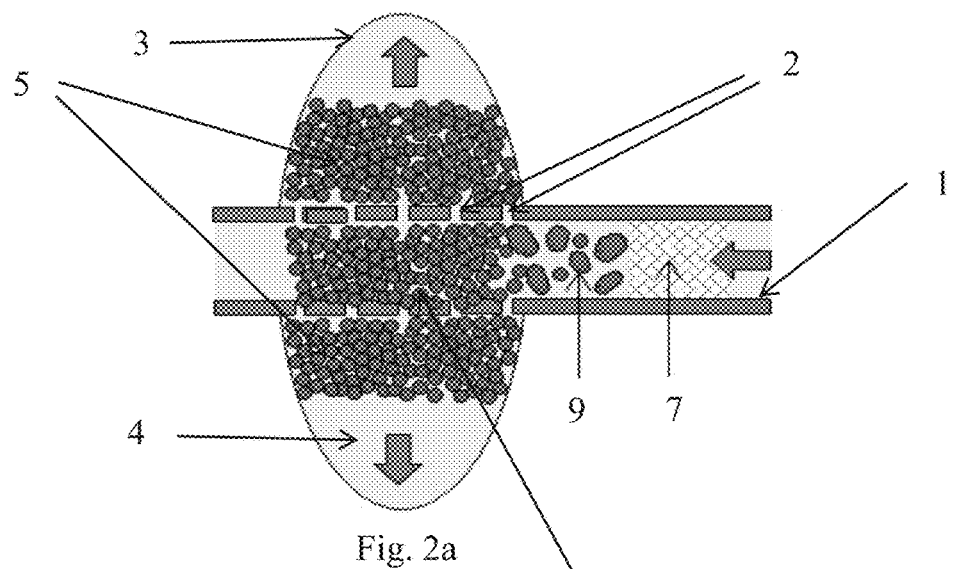
FIG. 2a shows schematically the hydraulic fracturing operation according to the method. The diagram shows hydraulic fracture formation, propagation, and injecting the near-wellbore slug with the proppant aggregates.
Figure 2B:
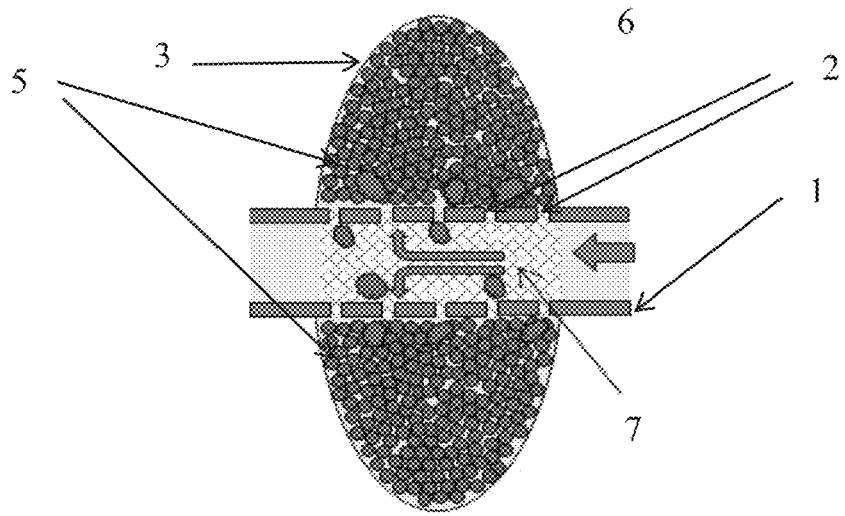
FIG. 2b shows schematically the hydraulic fracturing process according to the proposed technical solution. The diagram shows proppant pack formation in the fracture and injecting the tail-in slug comprising the proppant aggregates.
Figure 2C:
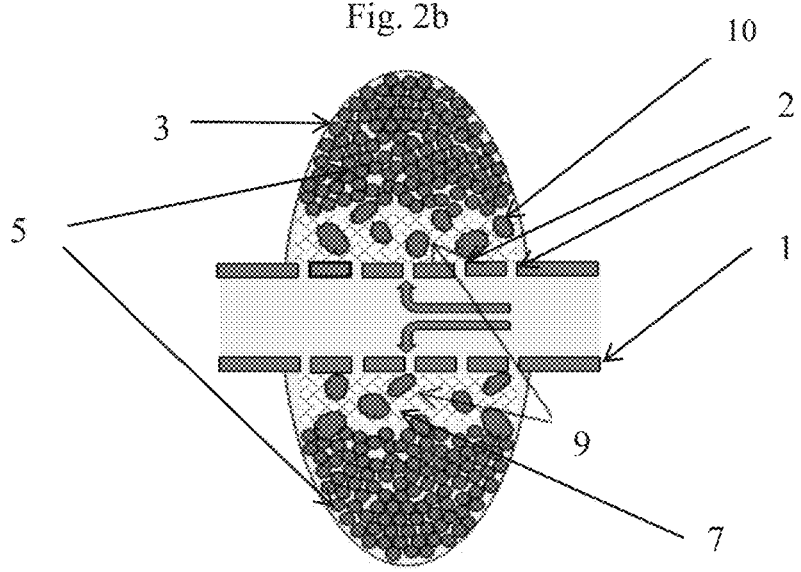
FIG. 2c shows schematically the hydraulic fracturing operation according to the proposed technical solution. The proppant aggregates are squeezed in the hydraulic fracture. Free channels are formed between the proppant aggregates to enable the fluid flow.

FIG. 2a, FIG. 2b, FIG. 2c show the multi-stage hydraulic fracturing operation according to the proposed technical solution. An embodiment is provided for the case of a horizontal well with a casing that has clusters of perforation openings.

FIG. 2a shows the initial stage of hydraulic fracturing. A pad (proppant-free fluid) 4 is injected under high pressure (higher than the fracture pressure) into the well with a casing 1 through perforation openings 2, which leads to the vertical fracture 3 formation and propagation in the productive formation. Following the pad fluid 4, the proppant slurry in a viscous carrier fluid is injected. With gradual filtration of the clean fracturing fluid 4 into the surrounding formation, a proppant pack 5 (a propping agent pack) is formed in the fracture 3 in two wings of the hydraulic fracture. A portion of the proppant 6 remains in the wellbore after not having been delivered to the hydraulic fracture. Following the proppant slurry injection stage, the final slug of the proppant slurry 9 based on the proppant aggregates is injected into the well (FIG. 2a shows the proppant aggregates as large structures). Following the final slug of the proppant slurry 9, a slug of the displacement fluid 7 is injected into the well to remove the proppant from the wellbore.

FIG. 2b shows the next stage of hydraulic fracturing. During the injection into the formation at a consistently high pressure (the "open fracture" situation), the slug of the displacement fluid 7 pushes the main slug of the proppant 6 and the tail-in slug of the proppant slurry 9 deep into the fracture: the tail-in slug of the proppant slurry 9 is prepared on the surface in the form of the proppant aggregates based on the polyelectrolyte complexes. The arrows in FIG. 2b show the flow direction of the fluid for proppant aggregates transport. The proppant aggregates are injected into the wellbore and pass through the perforation openings to the near-wellbore area 8 of the hydraulic fracture.

FIG. 2c shows the final stage of hydraulic fracturing. The tail-in slug of the proppant slurry 9 based on the proppant aggregates is forced (injected) into the near-wellbore area of the fracture using a slug of the displacement fluid 7, and after the closure of the fracture walls (caused by the injection termination) the proppant aggregates form the strong proppant pillars 11, and channels 10 are formed between these pillars with the clean (mainly proppant-free) fluid.

Figure 3A:
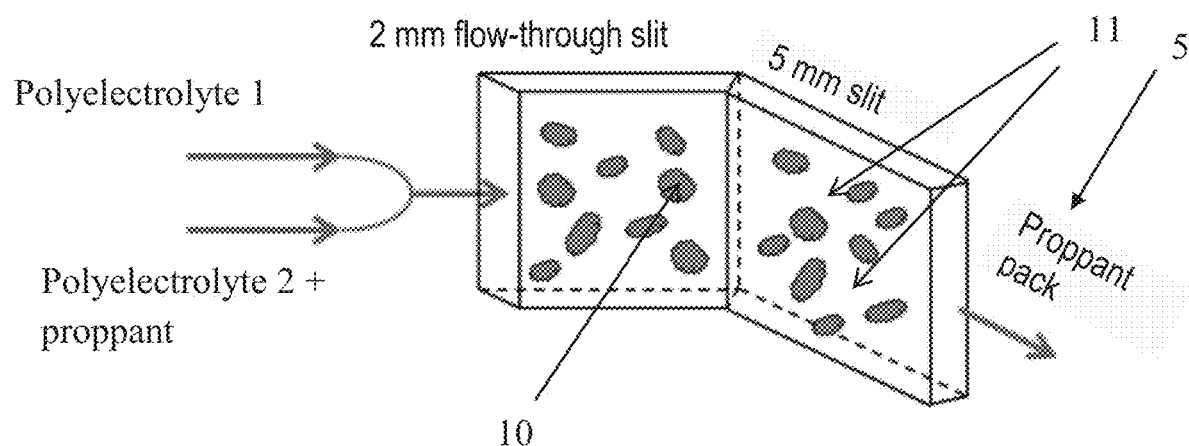
FIG. 3a shows the design of laboratory experiment on creating and placing the proppant aggregates in the hydraulic fracture.

FIG. 3a shows the design of a laboratory experiment of creating and placing the proppant aggregates. The proppant aggregates are produced in the surface equipment adapted for mixing two or more fluids, as well as for proppant mixing (forming the proppant slurry). The experiment design includes combining two fluid flows, and the fluids being mixed contain polyelectrolytes that differ in their charges (designated as polyelectrolyte 1 and polyelectrolyte 2), as well as the proppant. The said flows (designated as polyelectrolyte 1 and polyelectrolyte 2) have the concentrations of polyelectrolytes and pH such that after mixing the flows the clusters of the polyelectrolyte complexes (PEC) are produced, wherein the proppant particles are entrapped into PEC. Most of the proppant remains inside the formed PECs. Then the proppant-laden PECs are transferred to the fracture and held on the hydraulic fracture walls. The laboratory unit simulate the case of a branched hydraulic fracture in the surrounding rock: the first portion of the fracture is in the form of a narrow flow-through slit with the width of 2 mm, which is directly connected to the branched portion of the fracture (or secondary fracture), which is simulated by a flow-through slit with the width of 5 mm. The second flow-through slit ensures the flow of the fluid to a vertically oriented cell with a solid proppant pack (the details of the proppant pack section are not shown in FIG. 3a and FIG. 3b).

Figure 3B:
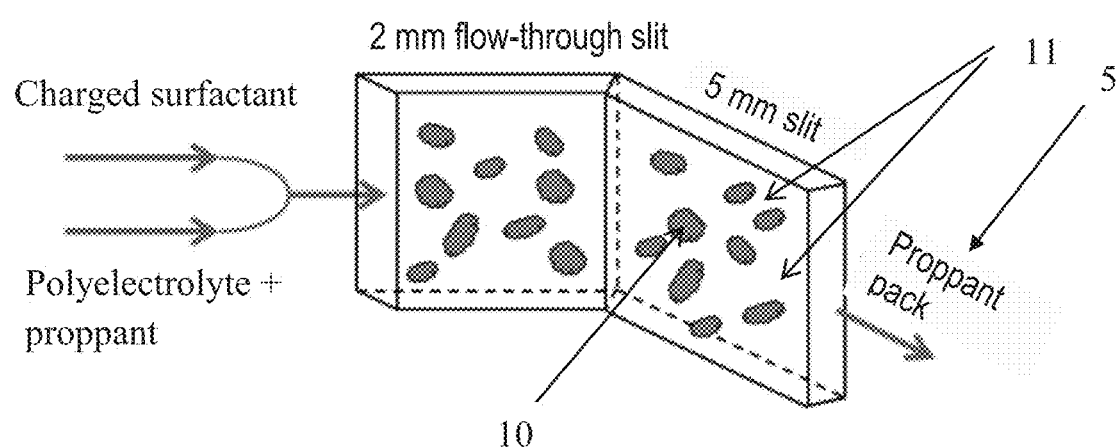
FIG. 3b shows the design of laboratory experiment on creating and placing the proppant aggregates (based on an electrolyte complex with surfactants) in the hydraulic fracture.

FIG. 3b shows the design of a laboratory experiment on forming and placing the proppant aggregates. The design of setup includes mixing two fluid flows (polyelectrolyte and oppositely charged surfactant), while one of the flows includes the proppant slurry. When mixed, these flows quickly form the proppant-laden polyelectrolyte complexes (PEC). The proppant-laden PECs are then transferred by the flow to the experiment cell and held on the walls of the vertical flow-through fracture (or the walls of the system of branched fractures).

The experiments according to FIG. 3a and FIG. 3b show the placement of the slug of the PEC-based proppant slurry in the near-wellbore area of the fracture (the step of placing the final proppant slurry slug).

Figure 4:
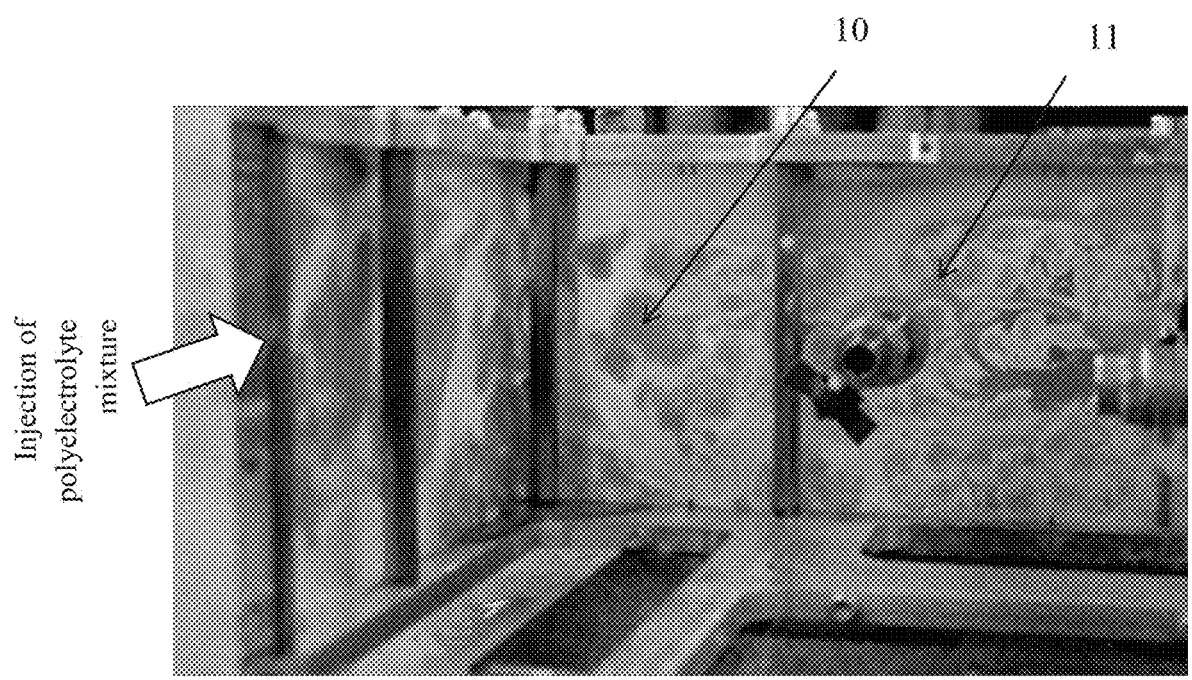
FIG. 4 shows the results of the experiments in the laboratory unit for placing the proppant aggregates in a hydraulic fracture (slot) model.

FIG. 4 shows the photo of a laboratory experiment of simulating the placement of the proppant aggregates 10 in the near-wellbore area of the hydraulic fracture (two vertically oriented fractures). The PEC-based proppant aggregates 10 are formed when the flows of two solutions of oppositely charged electrolytes are mixed (e.g. a mixture of a cationic polyelectrolyte and an anionic polyelectrolyte) at the inlet of the first flow-through slit. The proppant is added to one of the fluid flows containing polyelectrolytes. The produced PEC-based proppant aggregates have stuck to the walls of the flow-through slit due to the high viscosity of the polyelectrolyte complex. It can be seen that the proppant aggregates 10 form stable proppant clusters even at a high flow rate of the displacement fluid, and free channels 11 are formed between the proppant aggregates 10 (clusters) for the fluids to flow through. Increasing the fluid flow rate through the flow-through slits has a minor effect on the dimensions and the shape of the proppant aggregates 10.

As shown in the above description for FIG. 2a-2c, according to the proposed solution, hydraulic fracturing is a multi-stage process. The differences of the proposed hydraulic fracturing method from the known solutions can be observed in the embodiment of the last hydraulic fracturing stages when placing the proppant in the near-wellbore area of the fracture.

The method for hydraulic fracturing comprising several stages:

(i) injecting a slug of a proppant-free fluid through the well into the formation for hydraulic fracture creation and propagation; (ii) injecting a slug of the proppant-laden slurry into the formation to create a proppant pack in the hydraulic fracture; (iii) injecting a slug of slurry that contains a fluid and the proppant aggregates based on a polyelectrolyte complex to create permeable channels in the near-wellbore area of the hydraulic fracture; (iv) injecting a slug of a displacement fluid into the well. If the bottomhole pressure is reduced below the formation fracture pressure, the fracture closes and a proppant pack in the fracture is formed.

When performing step (ii), most of the proppant is injected into the fracture in the form of water slurry. Slurry of solid particles (the proppant) can be prepared at concentrations of 0.1 g/L to 100 g/L. Polymer-thickened aqueous solutions and cross-linked polymer-thickened aqueous solutions (gels), or water-oil emulsions, or high-viscosity surfactant-based fluids are used as a fluid for the proppant transport. The rheology of the carrier fluid allows the proppant transport down the wellbore and the placement of the proppant pack in the hydraulic fracture.

At stage 1(ii), a slug of the proppant-laden slurry is injected into the formation to create a proppant pack in the hydraulic fracture. Although FIGS. 2a-c show the formation of a homogeneous proppant pack, in other technique embodiments it is possible at stage 1(ii) to inject alternating pulses of the proppant slurry and slugs of the clean fluid, which, when delivered to the hydraulic fracture, ensure the heterogeneous placement of the proppant to form conductive channels. This technique of channel injection of a proppant is known as the HiWAY™ technology (trade mark from Schlumberger Technology Company) and is well understood by a person skilled in the art.

In an embodiment of the method, the volume of the proppant slurry slug at step (iii) is 0.1 to 10% of the slurry volume at stage 1(ii). A person skilled in the art understands that the volume of the tail-in slug of the proppant slurry should not be too low so as to avoid the closure of the fracture walls at the fracture closure stage.

The fracture is closed when the wellbore pressure becomes lower than the formation fracture pressure. In particular, a method for determining the fracture closure pressure in the hydraulic fracturing process is described in U.S. Pat. No. 8,838,427 (Schlumberger, published on 16 Sep. 2014).

In the described hydraulic fracturing method, the high fracture conductivity in the main area of the hydraulic fracture is provided by the proppant pack 5, and the fracture conductivity in the near-wellbore area is provided by a near-wellbore pack with conductive channels between the polyelectrolyte complex-based proppant aggregates.

A slug of the displacement fluid is injected into the well at step (iv) of the method. Persons skilled in the art know that in order to remove the proppant from the wellbore, a volume of the displacement fluid is injected that is equal to or exceeds the volume of the pipe string, through which the slug of the proppant-laden slurry was injected. Usually an aqueous fluid is used as the displacement fluid. Alternatively, the displacement fluid is injected in the form of a low-viscosity aqueous polymer solution, with the polymer added to reduce the friction of the aqueous fluid being injected. This reduces drag and decreases the load on the pumping equipment.

In an embodiment of the method, the proppant slurry for the tail-in stage is prepared by mixing the flows of water-soluble polycation and water-soluble polyanion, wherein the proppant is present in one of the injected polyelectrolyte solutions. When a proppant-bearing polyelectrolyte solution is mixed with a clean (proppant-free) oppositely charged polyelectrolyte, polyelectrolyte complexes are formed in the form of polymer-polymer clusters that hold the proppant particles (the proppant aggregates).

Since the proppant is represented by neutrally charged granules of sand or ceramics, the proppant can be added to the first polyelectrolyte solution. The second polyelectrolyte solution should be added to the prepared first polymer proppant-rich slurry.

According to an embodiment of the method, slurry to be injected contains a fluid and the polyelectrolyte complex-based proppant aggregates, and is produced by mixing a solution of a water-soluble cationic polyelectrolyte and proppant slurry in a water-soluble anionic polyelectrolyte.

According to an embodiment of the method, slurry to be injected contains a fluid and the polyelectrolyte complex-based proppant aggregates, and is produced by mixing a solution of a water-soluble anionic polyelectrolyte and proppant slurry in a water-soluble cationic polyelectrolyte.

In other words, to obtain the polyelectrolyte complex-based proppant aggregates, the flows of the solutions of a water-soluble polycation and a water-soluble polyanion are mixed at the well inlet (wherein the proppant is present in one of the solutions of water-soluble polyelectrolytes).

The polyelectrolyte complex-based proppant aggregates include a proppant, a cationic polyelectrolyte, and an anionic polyelectrolyte.

In an embodiment of the method, one of the polyelectrolytes for producing a proppant-bearing polyelectrolyte complex can be replaced with a charged surface active compound (surfactant). In the specialized literature, such "polyelectrolyte-surfactant" precipitate is reasonably considered to be a "polyelectrolyte complex".

In particular, a cationic polyelectrolyte carrying positively charged groups on the polymer chain can be replaced with a cationic surfactant (a positively charged group at the end of the surfactant molecule). Or an anionic polyelectrolyte carrying negatively charged groups on the polymer chain can be replaced with an anionic surfactant.

According to one embodiment, the polyelectrolyte complex-based proppant aggregates include a proppant, a cationic polyelectrolyte, and an anionic surfactant.

According to another embodiment, the polyelectrolyte complex-based proppant aggregates include a proppant, an anionic polyelectrolyte, and a cationic surfactant.

A person skilled in the art appreciates that there is a wide choice of water-soluble polyelectrolytes (charged polymers) to embody this technical solution. A person skilled in the art appreciates that there is a wide choice of surfactants (cationic surfactants and anionic surfactants) to embody this technical solution.

As an example, we can mention available anionic polyelectrolytes that are selected from the list of anionic polyacrylamides, poly(methacrylic acid), sodium polystyrene sulfonate, and carboxymethyl cellulose (CMC). By way of example, we can mention available cationic polyelectrolytes that are selected from the list of poly(diallyldimethylammonium) chloride (DADMAC), polyethyleneimine (PEI), and polyvinylpyrrolidone (PVP). A high proportion of charged groups on polymers at the specified pH of the aqueous fluid can be indicated as the main criterion for selecting a proper pair of oppositely charged polyelectrolytes.

According to an embodiment of the method, the solutions of polyelectrolytes that are mixed at step (iii) are prepared at pH >6.0. According to another embodiment of the method, the solutions of polyelectrolytes are prepared at pH in the range of >8.0 of the aqueous medium. For the majority of pairs of charged polymers, stronger polyelectrolyte complexes (polymer-polymer clusters) are formed when pH is in the alkaline region (pH >8.0), and they can carry a higher concentration of the proppant particles within their volume.

The function of the polyelectrolyte complex in injecting a slug of the proppant slurry is to bind the proppant particles and to transfer the proppant into the hydraulic fracture to form strong proppant clusters in the near-wellbore area of the fracture. At the same time, after the fracture closes and flow-through channels are formed between the proppant clusters, the binding function of the PEC is completed. Therefore, it is possible to prepare a composition for injecting the final proppant slug, which includes a polyelectrolyte destruction agent.

A polymer oxidation (breaking) agent can act as such breaking agent. Typical oxidizers used for well treatment can be mentioned as an example of the polymer breaking agents. Oxidizing agents are selected from inorganic peroxides, organic peroxides, and encapsulated peroxides. Peroxides of alkali metals and alkaline earth metals react with water to form a corresponding hydroxide and hydrogen peroxide. Powders of persulfates salts (ammonium persulfates, potassium persulfates) or other salts producing a strong oxidizing effect when dissolved in water can be used as polymer destruction agents. Alternatively, delayed polymer oxidizers selected from the group of encapsulated persulfates can be used. The destruction of the polyelectrolyte complex reduces the local polymer viscosity in the proppant aggregate area and increases the general conductivity of the near-wellbore area where the proppant aggregates are located.

In some embodiments, the oxidizing agent is added to the slug of polyelectrolyte that is the most resistant to the action of the oxidizing agent.

Although the description of the hydraulic fracturing method is given for the case of an inclined or horizontal well, it can be seen from the description that the method can also be used for a vertical well where there is a need for the proppant to be removed from the wellbore.

The said hydraulic fracturing method is especially applicable to well treatment situations when several operations are performed in succession for different perforation intervals.

After performing a hydraulic fracturing operation by stages (i)-(iv), the hydraulic fracture is isolated (e.g. by installing the isolating packers from two sides of the treated fracture), and then the next hydraulic fracturing operation is performed in the next interval.

According to the embodiment of the method, several hydraulic fracturing operations are performed, each of them can include the stage of injecting a slug of slurry, which contains a fluid and the polyelectrolyte complex-based proppant aggregates to form permeable channels in the near-wellbore area of the hydraulic fracture.

The following non-limiting examples are an additional illustration of the technical solution described.

EXAMPLES

Example 1

This example demonstrates the use of the proppant aggregates for placing in the near-fracture area of the hydraulic fracture and formation of islands and channels in that area. FIG. 3a shows the diagram of the unit for conducting the experiment. FIG. 4 shows a photo of the experiment results. The working fluid containing the polyelectrolyte complex (PEC) is pumped through the flow-through unit. To do this, two combined slit channels are used with the slit widths of 2 mm and 5 mm made of acrylic glass (these slit channels simulate an open fracture with a complex branched geometry).

Initially, aqueous solutions (in 2% KCl) of two types of polyelectrolyte are prepared for injection. These aqueous solutions have a neutral or slightly alkaline pH. For example, the first polyelectrolyte (polyelectrolyte 1) is a cationic charged polymer, and the second polyelectrolyte in the aqueous solution (polyelectrolyte 2) is an anionic charged polymer (prepared at the same pH level of the aqueous fluid). A sufficient amount of the proppant is added to one of the polyelectrolyte flows. Since the proppant (sand) is a neutral material, it can be added to any of the polyelectrolyte flows. Thus, one of the flows to the mixer is represented by the proppant slurry in an aqueous polyelectrolyte solution, and the other flow is an aqueous solution of the oppositely charged polyelectrolyte.

As shown in FIG. 3a, two flows of oppositely charged polyelectrolytes (charged polymers) are mixed before entering the first slit channel, and clusters based on a polyelectrolyte complex mixed with the proppant (40/70 mesh sand) are formed very quickly; this cluster is called the "proppant aggregate" or the "proppant agglomerate". The rest of the clean fluid in the flow being injected contains small concentrations of two polyelectrolytes and has low viscosity close to the viscosity of water. The formed proppant aggregates based on the polyelectrolyte complex are injected with the clean fluid into the slit channel (simulating the near-wellbore area of the open fracture in the hydraulic fracture process). The flow from the second slit channel is then delivered to the conductivity cell tightly filled with a highly permeable proppant pack (coarse 12/18 mesh sand); the conductivity cell simulates a solid proppant pack (see item 5 in FIG. 2b and FIG. 2c).

In Example 1, the following composition was tested for the polymer fluid being mixed. Flow 1 composition: aqueous slurry containing 2% KCl, 0.24 kg/L of 40/70 mesh sand, 4 g/L of anionic polyacrylamide (aPAM). Flow 2 composition: aqueous slurry containing 2% KCl and 4 g/L of branched polyethyleneimine (br-PEI). Both aqueous polymer solutions had pH=8.5. Tests in the experimental unit (shown in FIG. 3a) were performed at the room temperature (+20° C.).

A slug of the displacement fluid was pumped using a 2% KCl aqueous solution with 0.5 g/L of polyacrylamide (PAM) added at the room temperature.

As shown in FIG. 3b, the fluid and the produced proppant aggregates (the result of interaction of charged polymers) with the fluid flow velocity of 0.25 m/s (the flow velocity in relation to the full cross-sectional area of the slit channel No. 2) remain in the form of two immiscible phases. It was found that when the displacement fluid was further delivered to the model of the fracture, the proppant aggregates got stuck on the slit channel walls. Even when the displacement fluid flow velocity was increased to 3 m/s, the formed proppant aggregates were partly washed out of the slit channels demonstrating strong contact with the fracture walls.

This example demonstrates that polyelectrolyte complex-based proppant aggregates (aggregation of an anionic polymer and a cationic surfactant) ensure the formation of stable proppant islands (aggregates 10 in FIG. 3a) in the near-wellbore area of the hydraulic fracture, as well as conductive channels between the islands (channels 11 in FIG. 3b). The proppant aggregates are not washed out by the strong displacement fluid flow.

Example 2

This example demonstrates the behavior use of the polyelectrolyte complex-based proppant aggregates when they are placed in the near-wellbore area of the hydraulic fracture.

Two flows of charged polymers are mixed at the inlet to the vertical slit channel as shown in FIG. 3a. The first line channel is injected in the form of an aqueous solution of sodium polystyrene sulfonate (Na-PSS) with the concentration of 6% by weight at pH=9.0. The first line flow of proppant slurry also contains 0.35 kg/L of 40/70 mesh sand in an aqueous polycation solution. The second flow (aqueous polycation solution) contains poly(diallyldimethylammonium) chloride (DADMAC) with the concentration of 3% by weight at pH=9.0.

Similarly to the process described in Example 1, highly viscous proppant aggregates are formed and transported by the flow into the vertically oriented slit channels with the width of 2 mm and 5 mm. After the flows join together, the proppant aggregates and the clean fluid (proppant-free) remain in the form of two separate phases. At the flow velocity of 0.4 m/s (average flow rate velocity through a vertical slit with the width of 5 mm) the formed proppant aggregates remain unchanged on the slit channel walls.

At the second step of the experiment, the reverse flow of a clean aqueous fluid (pH=6.0, 2% KCl) is injected through the conductivity cell filled with the coarse 20/40 mesh proppant, and the water flow runs in the opposite direction through two combined flow-through channels (one with the width of 5 mm, the other with the width of 2 mm). The average flow rate velocity of the reverse flow of aqueous fluid is gradually increased to 2.5 m/s, and the main part of the proppant aggregates remains on the channel walls. Almost no sand is washed out of the conductivity cell (not shown) with this velocity of the reverse flow. This experiment demonstrates the resistance of the main proppant pack and the proppant aggregates in the near-wellbore area of the fracture to the proppant flowback phenomenon at the step of formation operation with a hydraulic fracture treated according to the described method.

Example 3

The example discloses the use of polymer oxidizers to break down the polyelectrolyte complexes after a hydraulic fracturing operation is completed. FIG. 3a shows that at the stage of performing a hydraulic fracturing operation and upon its completion the fluid flows free through the channels (ducts) between the proppant aggregates distributed throughout the volume of the slit channel.

At the same time, almost no fluid penetrates through highly viscous (polymeric) PEC-based proppant aggregates. When the hydraulic fracture has been closed and the proppant aggregates have performed their propping function in the fracture, there exits an opportunity to increase the total hydraulic conductivity of the near-wellbore area of the fracture with the proppant aggregates, if the polyelectrolyte complex clusters are destroyed (dissolved) after the proppant is placed. This is accomplished by adding an oxidizing agent with the delayed action ("delayed oxidizer"). At the wellbore temperature and pressure the oxidizer starts reacting with the PEC polymers and destroy individual bonds in the polymer chains of polyelectrolytes.

The procedure of creating the proppant aggregates at the room temperature of 25° C. is similar to the procedure described in Example 1, except that a polymer oxidizer (ammonium persulfate powder) with the concentration of 0.5 g/L was added to the aqueous polyanion (aPAM) solution. After mixing two flows and sticking of the formed proppant aggregates on the walls of the flow-through slit channel (FIG. 3b), a 2% KCl solution was slowly (average speed of 0.1 m/s) pumped through the experimental unit at an increased temperature of 60-65° C. and pH=9.0. At an increased temperature (>60° C.) the polymer oxidizer ensures rapid destruction of the interpolymer complex (a-PAM:br-PEI in this particular case). After 1.5 hours of pumping hot water through the slit channels with the proppant aggregates, the aggregates are destroyed to the state of low-viscosity fluid (effect of the oxidizer) and the sand comes out from the aggregates to the bottom of the slit channels.

Example 4

This example demonstrates the behavior of the polyelectrolyte complex-based proppant aggregates when they are placed in the near-wellbore area of the hydraulic fracture (injecting the tail-in proppant slurry into the formation).

Two flows are mixed at the inlet to the vertical slit channel as shown in FIG. 3c. The first line channel is injected in the form of an aqueous solution of anionic polyacrylamide (aPAM) with the concentration of 0.05% by weight at pH=7.0. The first line flow of slurry also contains 0.35 kg/L of 40/70 mesh sand. The second flow (aqueous solution of an cationic surfactant) contains quaternary ammonium salt with a long lipophilic tail (longer than C12) with the concentration of 0.05% by weight and pH=7.0.

Similarly to the process described in Example 1, highly viscous proppant aggregates are formed during mixing ("polymer-surfactant" precipitates) and transferred by the flow into the slit channels with the width of 2 mm and 5 mm. At the flow velocity of 0.4 m/s (average flow rate velocity through a vertical slit with the width of 5 mm) the formed PEC-based proppant aggregates remain unchanged on the slit channel walls.

Similarly to the details in FIG. 3b, at a clean fluid speed of 0.25 m/s the clean fluid and the formed proppant aggregates remain in the form of two immiscible phases. It has been found that when the clean fluid (the displacement fluid) is further delivered to the model of the fracture, the proppant aggregates based on the polymer-surfactant complex are held on the slit channel walls. Even when the flow velocity of the clean displacement fluid (2% KCl in water without a proppant) was increased to 3 m/s, the formed proppant aggregates were partly washed out of the slit channels.

This demonstrates that the polyelectrolyte complex-based proppant aggregates (complex of an anionic polymer and a cationic surfactant) ensure the formation of stable proppant islands (aggregates 10 in FIG. 3b) in the near-wellbore area of the hydraulic fracture and conductive channels between the islands (channels 11 in FIG. 3b), and the proppant islands are not washed out by the strong flow of the displacement fluid and remain in the near-wellbore area of the fracture.

It is apparent that the above embodiments shall not be regarded as a limitation of the scope of the patent claims. It is clear for a person skilled in the art that it is possible to make many changes to the embodiments described above without departing from the principles of the disclosure claimed in the claims.

The invention claimed is:
1. A method of hydraulic fracturing, consisting of: (i) injecting only one proppant-free fluid through a well into a formation to create only a single hydraulic fracture having two wings; (ii) immediately following the creation of the single hydraulic fracture, injecting a proppant-laden slurry without polyelectrolytes into the formation to create a proppant pack in the single hydraulic fracture; (iii) preparing a proppant-laden slurry by mixing water, proppant and two polyelectrolytes, wherein the two polyelectrolytes form a complex that causes formation of proppant aggregates; (iv) injecting the proppant-laden slurry containing the aggregates into a near-wellbore region of the single hydraulic fracture, thereby creating permeable channels in the near-wellbore region of the single hydraulic fracture; and (v) injecting a displacement fluid into the well.

2. The method of claim 1, wherein the two polyelectrolytes are a water-soluble cationic polyelectrolyte and a water-soluble anionic polyelectrolyte; and wherein the mixing in step (iii) by comprises first preparing a mixture of the proppant and the water-soluble cationic polyelectrolyte, and then adding the water-soluble anionic polyelectrolyte to the mixture.

3. The method of claim 2, wherein the water-soluble anionic polyelectrolyte comprises polyacrylamides, poly(methacrylic acid), sodium polystyrene sulfonate, carboxymethyl cellulose (CMC), or a combination thereof.

4. The method of claim 2, wherein the water-soluble cationic polyelectrolyte comprises cationic copolymers of polyacrylamide, poly(diallyldimethylammonium) chloride (DADMAC), polyethyleneimine (PEI), or a combination thereof.

5. The method of claim 1, wherein the two polyelectrolytes are a water-soluble cationic polyelectrolyte and a water-soluble anionic polyelectrolyte; and wherein the mixing in step (iii) comprises first preparing a mixture of the proppant and a the water-soluble anionic polyelectrolyte, and then adding the water-soluble cationic polyelectrolyte to the mixture.

6. The method of claim 1, wherein the proppant-laden slurry of step (iii) additionally comprises an oxidizing agent.

7. The method of claim 1, wherein the slurry at step (iii) has pH >6.0.

8. The method of claim 1, wherein a volume of the slurry at step (iii) is about 0.1 to about 10.0% of a volume of the slurry at step (ii).

9. The method of claim 1, wherein the displacement fluid is an aqueous polymer solution.

10. A method of hydraulic fracturing, consisting of: (i) injecting only one proppant-free fluid through a well into a formation to create only a single hydraulic fracture having two wings; (ii) immediately following the creation of the single hydraulic fracture, injecting a proppant-laden slurry without polyelectrolytes into the formation to create a proppant pack in the single hydraulic fracture; (iii) preparing a proppant-laden slurry by mixing water, proppant and two polyelectrolytes, wherein the two polyelectrolytes form a complex that causes formation of proppant aggregates; (iv) injecting the proppant-laden slurry containing the aggregates into a near-wellbore region of the single hydraulic fracture, thereby creating permeable channels in the near-wellbore region of the single hydraulic fracture; (v) injecting a displacement fluid into the well; and (vi) isolating the single hydraulic fracture, and performing a next hydraulic fracturing operation.

11. A method of hydraulic fracturing, consisting of: (i) injecting only one single proppant-free fluid through a well into a formation to create only a single hydraulic fracture having two wings; (ii) immediately following the creation of the single hydraulic fracture, injecting a proppant-laden slurry without polyelectrolytes into the formation to create a proppant pack in the single hydraulic fracture; (iii) preparing a proppant-laden slurry by mixing water, proppant, a polyelectrolyte and a surfactant, wherein the polyelectrolyte and the surfactant form a complex that causes formation of proppant aggregates; (iv) injecting the proppant-laden slurry containing the aggregates into a near-wellbore region of the single hydraulic fracture, thereby creating permeable channels in the near-wellbore region of the single hydraulic fracture; and (v) injecting a displacement fluid into the well.

12. The method of claim 11, wherein the polyelectrolyte is an anionic polyelectrolyte, the surfactant is a cationic surfactant, and the proppant aggregates comprise the proppant, the anionic polyelectrolyte, and the cationic surfactant.

13. The method of claim 11, wherein the polyelectrolyte is an cationic polyelectrolyte, the surfactant is an anionic surfactant and the proppant aggregates comprise the proppant, the cationic polyelectrolyte, and the anionic surfactant.

* * * * *